(12) United States Patent
Takahashi et al.

(10) Patent No.: US 11,470,600 B2
(45) Date of Patent: Oct. 11, 2022

(54) USER TERMINAL AND RADIO BASE STATION

(71) Applicant: NTT DOCOMO, INC., Tokyo (JP)

(72) Inventors: Hideaki Takahashi, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 23 days.

(21) Appl. No.: 17/056,208

(22) PCT Filed: May 18, 2018

(86) PCT No.: PCT/JP2018/019300
§ 371 (c)(1),
(2) Date: Nov. 17, 2020

(87) PCT Pub. No.: WO2019/220624
PCT Pub. Date: Nov. 21, 2019

(65) Prior Publication Data
US 2021/0227515 A1    Jul. 22, 2021

(51) Int. Cl.
*H04W 72/04*    (2009.01)
*H04L 1/00*    (2006.01)

(52) U.S. Cl.
CPC ......... *H04W 72/042* (2013.01); *H04L 1/0002* (2013.01); *H04L 1/0013* (2013.01); *H04W 72/0453* (2013.01)

(58) Field of Classification Search
CPC ... H04W 52/146; H04W 52/08; H04W 76/27; H04W 52/248; H04W 52/247; H04W 72/04; H04W 52/58; H04W 52/54; H04W 72/042; H04W 52/0229; H04W 52/0261; H04W 8/24; H04W 52/0235; H04W 52/0251; H04L 27/26; H04L 5/0053; H04L 1/0003; H04L 27/2602; H04L 1/0002; Y02D 30/70
See application file for complete search history.

(56) References Cited

U.S. PATENT DOCUMENTS

2019/0044689 A1* 2/2019 Yiu .................. H04L 5/0091
2021/0045092 A1* 2/2021 Gotoh .............. H04W 52/146
2021/0329556 A1* 10/2021 Kim ................. H04W 52/0229

OTHER PUBLICATIONS

International Search Report issued in Application No. PCT/JP2018/019300, dated Aug. 7, 2018 (4 pages).
Written Opinion issued in International Application No. PCT/JP2018/019300, dated Aug. 7, 2018 (3 pages).

(Continued)

*Primary Examiner* — Jung Liu
(74) *Attorney, Agent, or Firm* — Osha Bergman Watanabe & Burton LLP

(57) ABSTRACT

A user terminal according to one aspect of the present disclosure includes: a receiving section that receives downlink control information including a given field indicating a frequency domain resource to be assigned to a downlink shared channel or an uplink shared channel; and a control section that controls reception of the downlink shared channel or transmission of the uplink shared channel based on whether or not information related to a band for initial access in a carrier is given by a higher layer.

13 Claims, 11 Drawing Sheets

(56) References Cited

OTHER PUBLICATIONS

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued in Application No. 18918911.1 dated Dec. 10, 2021 (8 pages).
NTT DOCOMO, Inc., "Bandwidth configuration for basic BWP operation" 3GPP TSG-RAN WG2 #102, R2-1807390, May 21-25, 2018, Busan, Korea, (3 pages).
"3rd Generation Partnership Project; Technical Specification Group Radio Access Network; NR; Multiplexing and channel coding (Release 15)", 3GPP Standard; Technical Specification; 3GPP TS 38.212 V15.1.1, 3rd Generation Partnership Project, Mobile Competence Centre; France, Apr. 9, 2018 (94 pages).

\* cited by examiner

USER TERMINAL AND RADIO BASE STATION

TECHNICAL FIELD

The present disclosure relates to a user terminal and a radio base station of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

In legacy LTE systems (e.g., LTE Rel. 8 to 14), a user terminal (UE: User Equipment) controls reception of a downlink shared channel (e.g., PDSCH: Physical Downlink Shared Channel) based on Downlink Control Information (DCI) (also referred to as, for example, a Downlink (DL) assignment) from a radio base station (e.g., eNB: eNodeB).

Furthermore, the user terminal controls transmission of an uplink shared channel (e.g., PUSCH: Physical Uplink Shared Channel) based on DCI (also referred to as, for example, an Uplink (UL) grant) from the radio base station. In addition, the DCI is one of control signals of a physical layer, and is transmitted to the user terminal by using a downlink control channel (e.g., PDCCH (Physical Downlink Control Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is assumed for future radio communication systems (e.g., NR, 5G, 5G+, Rel. 15 and subsequent releases) to use a carrier (e.g., 100 to 400 MHz) of a wider bandwidth than that of a carrier (e.g., 20 MHz at maximum) of the above legacy LTE systems. Hence, it is studied to configure one or more partial bands in the carrier to a user terminal, and perform communication by using at least one of the one or more bands. The partial band in the carrier will be referred to as, for example, a Bandwidth Part (BWP).

Furthermore, it is also studied for the future radio communication systems to provide a BWP (also referred to as, for example, an initial BWP) for initial access in a carrier. However, it is also assumed for the future radio communication systems that there are a plurality of values that are bandwidths of an initial BWP (e.g., a value based on a Master Information Block (MIB) conveyed on a broadcast channel (PBCH: Physical Broadcast Channel), and a value based on a System Information Block (SIB) 1).

Therefore, there is a risk that the user terminal cannot appropriately control transmission of a downlink shared channel (e.g., PDSCH: Physical Downlink Shared Channel) or an uplink shared channel (e.g., PUSCH: Physical Uplink Shared Channel) to be assigned in an initial BWP.

The present invention has been made in light of this point, and one of objects of the present invention is to provide a user terminal and a radio base station that can appropriately control transmission of at least one of a downlink shared channel and an uplink shared channel to be assigned in an initial BWP.

Solution to Problem

A user terminal according to one aspect of the present disclosure includes: a receiving section that receives downlink control information including a given field indicating a frequency domain resource to be assigned to a downlink shared channel or an uplink shared channel; and a control section that controls reception of the downlink shared channel or transmission of the uplink shared channel based on whether or not information related to a band for initial access in a carrier is given by a higher layer.

Advantageous Effects of Invention

According to one aspect of the present disclosure, it is possible to appropriately control transmission of at least one of a downlink shared channel and an uplink shared channel to be assigned in an initial BWP.

DESCRIPTION OF EMBODIMENTS

It is assumed for future radio communication systems (e.g., NR, 5G, 5G+, Rel. 15 and subsequent releases) to use a carrier (e.g., 100 to 400 MHz) of a wider bandwidth than that of a carrier (e.g., 20 MHz) of legacy LTE systems (e.g., Rel. 8 to 13). Hence, it is studied to configure one or more partial bands in the carrier to a user terminal, and perform communication by using at least one of the one or more bands.

The carrier will be also referred to as, for example, a Component Carrier (CC), a cell, a serving cell or a system bandwidth. Furthermore, the partial bands in the carrier will be referred to as, for example, Bandwidth Parts (BWPs). The BWPs may include BWPs for uplink (uplink BWPs) and BWPs for downlink (downlink BWPs).

For example, one or more BWPs (at least one of one or more uplink BWPs and one or more downlink BWPs) may be configured to the user terminal, and at least one of the configured BWPs may be activated. The activated BWP will be also referred to as, for example, an active BWP.

Furthermore, a BWP for initial access (initial BWP) may be configured to the user terminal. The initial BWP may include at least one of an initial BWP for downlink (initial downlink BWP) and an initial BWP for uplink (initial uplink BWP).

During the initial access, at least one of detection of a synchronization signal, obtaining of broadcast information (e.g., Master Information Block (MIB)) and establishment of connection by random access may be performed.

A bandwidth of the initial BWP may be configured based on an index (also referred to as, for example, pdcch-ConfigSIB1 or RMSI-PDCCH-Config) in the MIB transmitted via a broadcast channel (also referred to as, for example, a PBCH: Physical Broadcast Channel or a P-BCH).

Figure 1:
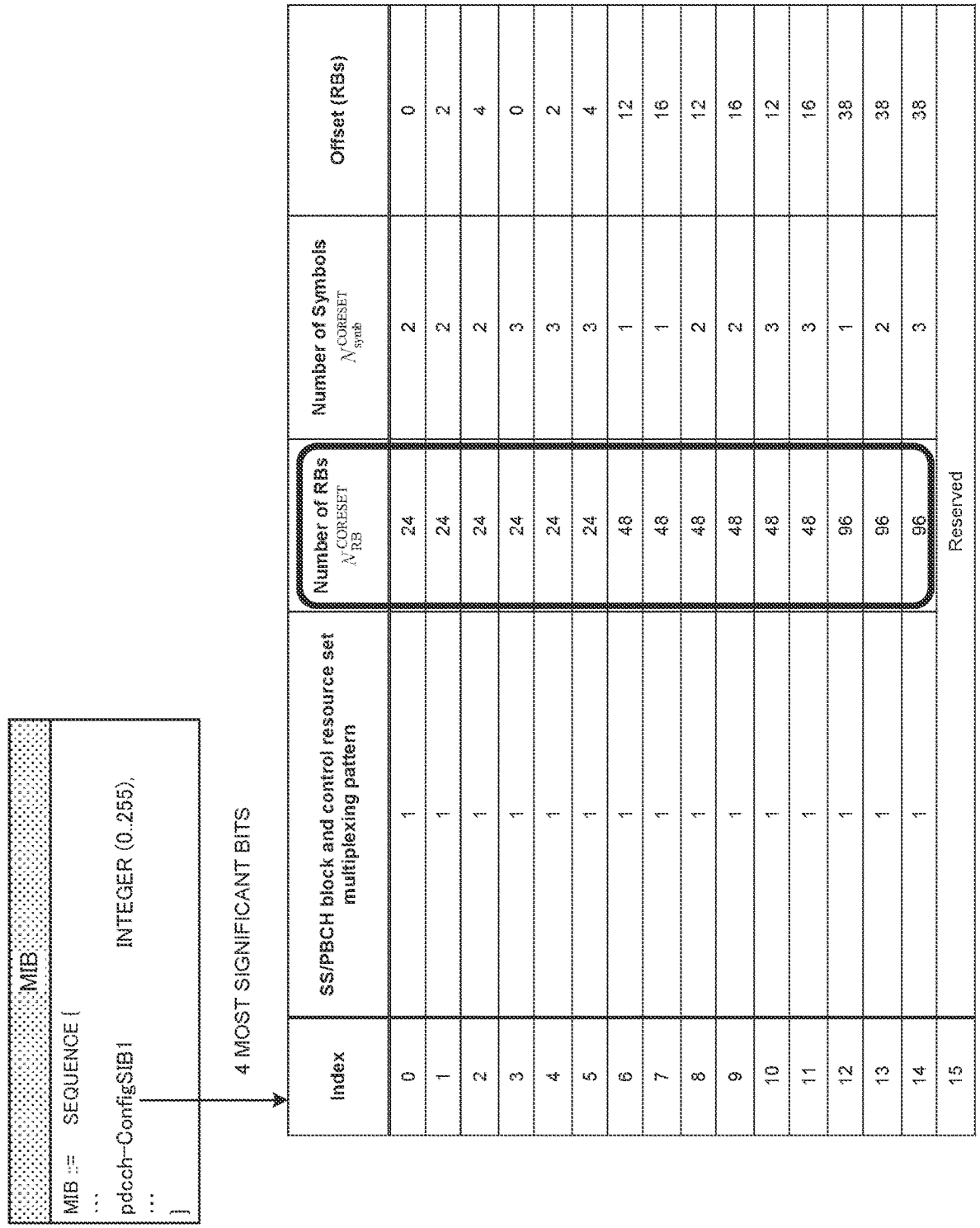
FIG. 1 is a diagram illustrating one example of determination of a bandwidth of an initial BWP based on an MIB.

FIG. 1 is a diagram illustrating one example of determination of a bandwidth of an initial BWP based on an MIB. As illustrated in FIG. 1, the MIB includes pdcch-ConfigSIB1 having a given number of bits (e.g., 8 bits). The user terminal determines the bandwidth of the initial BWP based on at least one bit value of pdcch-ConfigSIB1.

For example, in FIG. 1, the user terminal may determine as the bandwidth of the initial BWP the number of Resource Blocks (RBs) ($N^{CORESET}_{RB}$) to be associated with an index indicated by 4 Most Significant Bits (MSBs) of pdcch-ConfigSIB1. In FIG. 1, the bandwidth of the initial BWP (the number of RBs) is determined as one of 24, 48 and 96.

In this regard, the value to be associated with the index in FIG. 1 is one example, and is not limited to those illustrated in FIG. 1. For example, each value may be changed based on at least one of a minimum channel bandwidth and a subcarrier spacing.

Furthermore, the bandwidth of the initial BWP may be paraphrased as the number of RBs that compose a given Control Resource Set (CORESET). In this regard, the CORESET is an assignment candidate domain of a downlink control channel (e.g., Physical Downlink Control Channel (PDCCH)). One or more search spaces may be configured to the CORESET, and the user terminal may monitor (blind-decode) DCI in the search spaces.

The search spaces may include a search space (Common Search Space (CSS)) that is used to monitor DCI that is common (cell-specific) between one or more user terminals, and a search space (User-specific Search Space (USS)) that is used to monitor user terminal-specific DCI.

The CSS may include a search space for DCI that includes a Cyclic Redundancy Check (CRC) bit to be scrambled (i.e., that is subjected to CRC scrambling) by a given identifier (e.g., SI-RNTI: System Information-Radio Network Temporary Identifier). The search space will be also referred to as, for example, a type 0-PDCCH CSS, a search space for an SIB 1 or a search space for Remaining Minimum System Information (RMSI).

The above given CORESET for which the number of RBs is determined based on pdcch-ConfigSIB1 may be a CORESET that is provided with the type 0-PDCCH CSS. In this regard, "the bandwidth of the initial BWP" may be paraphrased as the number of RBs of the CORESET that is provided with the type 0-PDCCH CSS.

As described above, there is a risk that the bandwidth of the initial BWP determined based on pdcch-ConfigSIB1 is limited to three bandwidths of 24, 48 and 96. It is assumed that the user terminal supports only 1 BWP depending on capability of the user terminal (UE capability). Therefore, it is not preferred that the bandwidth of the initial BWP is limited to the three bandwidths.

Hence, it is studied to indicate the bandwidth of the initial BWP based on the SIB 1. In addition, the user terminal detects DCI in relation to the type 0-PDCCH CSS in the CORESET determined based on pdcch-ConfigSIB1 in an MIB, and receives the SIB 1 by using a PDSCH scheduled by the DCI.

Figure 2:
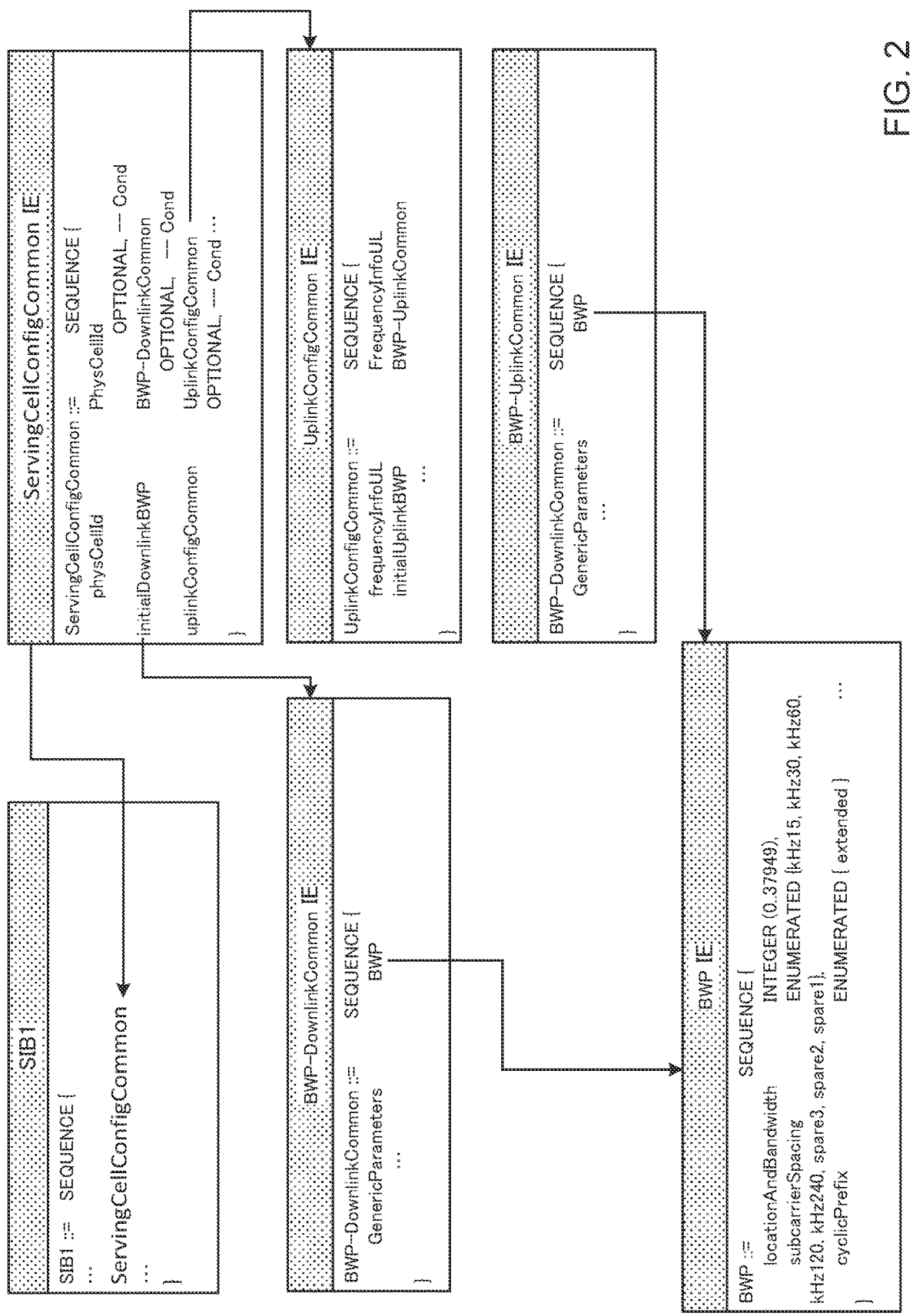
FIG. 2 is a diagram illustrating one example of determination of a bandwidth of an initial BWP based on an SIB 1.

FIG. 2 is a diagram illustrating one example of determination of the bandwidth of the initial BWP based on the SIB 1. As illustrated in FIG. 2, the SIB 1 may include information (also referred to as bandwidth/location information or specific information such as locationAndBandwidth) used to determine at least one of the bandwidth and a frequency domain location of the initial BWP. locationAndBandwidth may include a given number of bits (e.g., 15 bits).

The user terminal may determine the bandwidth of the initial BWP (the number of RBs) based on at least one bit of locationAndBandwidth. For example, the user terminal may determine the number of RBs to be associated with an index indicated by at least one bit of locationAndBandwidth as the bandwidth of the initial BWP in a table that associates at least given indices and the numbers of RBs.

Furthermore, the user terminal may determine the frequency domain location of the initial BWP based on at least one bit of locationAndBandwidth. The frequency domain location may be indicated by a distance (the number of RB s) from a lowest subcarrier (point A) of a resource block (also referred to as, for example, a reference resource block or a common RB 0) that serves as a reference in a carrier. The user terminal may determine the above frequency domain location of the initial BWP based on the above distance indicated by at least one bit of locationAndBandwidth.

As illustrated in FIG. 2, the SIB 1 may include configuration information of a cell-specific parameter (e.g., ServingCellConfigCommon). ServingCellConfigCommon may include information related to the initial downlink BWP (e.g., initialDownlinkBWP). A cell-specific common parameter (BWP-DownlinkCommon) may be provided for initialDownlinkBWP. BWP-DownlinkCommon may include, for example, above-described locationAndBandwidth.

The user terminal may determine at least one of the bandwidth and the frequency domain location of the initial downlink BWP based on locationAndBandwidth in BWP-DownlinkCommon provided for initialDownlinkBWP.

Furthermore, ServingCellConfigCommon may include uplink common configuration information (e.g., UplinkConfigCommon). UplinkConfigCommon may include information related to the initial uplink BWP (e.g., initialUplinkBWP). A cell-specific common parameter (e.g., BWP-UplinkCommon) may be provided for initialUplinkBWP. BWP-UplinkCommon may include, for example, above-described locationAndBandwidth.

The user terminal may determine at least one of the bandwidth and the frequency domain location of the initial downlink BWP based on locationAndBandwidth in BWP-UplinkCommon provided for initialUplinkBWP.

In addition, a hierarchical structure of parameters illustrated in FIG. 2 is only one example, and is not limited to that illustrated in FIG. 2. In, for example, FIG. 2, information related to the initial downlink BWP (e.g., BWP-DownlinkCommon given for initialDownlinkBWP) is included in ServingCellConfigCommon, yet may be included in any Information Element (IE) of any hierarchy in the SIB 1. Furthermore, the bandwidth/location information (e.g., locationAndBandwidth) of the initial downlink BWP is included in BWP-DownlinkCommon given for initialDownlinkBWP, yet may be included in any IE of any hierarchy.

Furthermore, information related to the initial uplink BWP (e.g., BWP-UplinkCommon given for initialUplinkBWP) is included in UplinkConfigCommon in ServingCellConfigCommon, yet may be included in any IE of any hierarchy in the SIB 1. Furthermore, the bandwidth/location information (e.g., locationAndBandwidth) of the initial uplink BWP is included in BWP-UplinkCommon given for initialUplinkBWP, yet may be included in any IE of any hierarchy.

The bandwidth of at least one of the initial downlink BWP and the initial uplink BWP (initial downlink BWP/initial uplink BWP) determined based on the bandwidth/location information (e.g., locationAndBandwidth) in the above SIB 1 may be a bandwidth wider than a bandwidth (e.g., 24, 48 or 96 RBs) determined based on pdcch-ConfigSIB1 in the MIB.

Furthermore, when receiving the SIB 1 including the bandwidth/location information (e.g., locationAndBandwidth) of the initial downlink BWP/initial uplink BWP, the user terminal may apply the bandwidth determined based on the bandwidth/location information to the initial downlink BWP/initial uplink BWP. On the other hand, when not receiving the SIB 1 including the bandwidth/location information (e.g., locationAndBandwidth) of the initial downlink BWP/initial uplink BWP, the user terminal may apply the bandwidth determined based on pdcch-ConfigSIB1 in the MIB to the initial downlink BWP/initial uplink BWP.

Thus, when information related to the initial BWP (e.g., at least one of BWP-DownlinkCommon for initialDownlinkBWP and BWP-UplinkCommon for initialUplinkBWP) is included in the SIB 1, there can be both of a value based on pdcch-ConfigSIB1 in an MIB and a value based on the bandwidth/location information in the SIB 1 as the bandwidth of the initial BWP (initial downlink BWP/initial uplink BWP).

In this case, there is a risk that the user terminal cannot appropriately control reception of a PDSCH and transmission of a PUSCH in the initial downlink BWP/initial uplink BWP. In addition, a similar problem occurs not only in a case where information related to the initial BWP is included in, for example, the above SIB 1, but also in a case where the information is included in a Radio Resource Control (RRC) message.

For example, it is assumed for the above future radio communication systems that a given field (e.g., Frequency domain resource assignment) in DCI (DL assignment) indicates a frequency domain resource to be assigned to a PDSCH in the initial downlink BWP. It is assumed that the number of bits of the given field is determined based on the bandwidth of the initial downlink BWP.

Similarly, it is assumed for the future radio communication systems that a given field (e.g., frequency domain resource assignment) in DCI (UL grant) indicates a frequency domain resource to be assigned to a PUSCH in the initial uplink BWP. It is assumed that the number of bits of the given field is determined based on the bandwidth of the initial uplink BWP.

However, when a plurality of values (e.g., the value based on pdcch-ConfigSIB1 in the MIB and the value based on the bandwidth/location information in the SIB 1) are assumed as the bandwidth of the initial downlink BWP/initial uplink BWP as described above, there is a risk that it is not possible to appropriately determine the number of bits in the given field in the above DCI.

Furthermore, it is assumed for the above future radio communication systems to use the bandwidth of the initial downlink BWP/initial uplink BWP for bit selection, too, during rate matching (e.g., rate matching for a Low-Density Parity-Check code (LDPC)). Hence, when a plurality of above values are assumed as the bandwidth of the initial downlink BWP/initial uplink BWP, there is a risk that it is not possible to appropriately control bit selection during the rate matching.

Thus, when one or more values are assumed as the bandwidth of the initial downlink BWP/initial uplink BWP, there is a risk that the user terminal cannot appropriately control transmission of a PDSCH to be assigned in the initial downlink BWP or transmission of a PUSCH to be assigned in the initial uplink BWP.

Hence, the inventors of the present invention have conceived appropriately controlling reception of a PDSCH and transmission of a PUSCH in the initial downlink BWP/initial uplink BWP based on whether or not information related to the initial BWP (e.g., at least one of BWP-DownlinkCommon for initialDownlinkBWP and BWP-UplinkCommon for initialUplinkBWP) is given by a higher layer.

The present embodiment will be described in detail below with reference to the drawings.

In the present embodiment, "whether or not information related to an initial BWP is given by a higher layer" may be paraphrased as "whether or not the information related to the initial BWP is included in at least one of the SIB 1 and an RRC message". The RRC message may be transmitted by at least one of a handover procedure, an addition procedure of a Primary Secondary Cell (PSCell) in a case of Dual Connectivity (DC), and an addition procedure of a Secondary Cell (SCell) in a case of DC or Carrier Aggregation (CA).

When the RRC message is transmitted by the handover procedure, the information related to the initial BWP may be information related to the initial BWP in a handover destination cell (target cell). Furthermore, when the RRC message is transmitted by the addition procedure of the PSCell or the SCell, the information related to the initial BWP may be information related to the initial BWP in the PSCell or the SCell to be added.

The following description assumes that "the information related to the initial BWP" is at least one of BWP-DownlinkCommon for initialDownlinkBWP and BWP-Uplink- Common for initialUplinkBWP. However, the present embodiment is not limited to this. "The information related to the initial BWP" may be any information as long as "the information related to the initial BWP" is information including at least one of a bandwidth/location information of the initial downlink BWP and a bandwidth/location information of the initial uplink BWP.

(First Aspect)

According to the first aspect, a user terminal may determine the number of bits of a given field indicating a frequency domain resource to be assigned to a PDSCH or a PUSCH in DCI based on whether or not information related to an initial BWP (a band for initial access) (e.g., BWP-DownlinkCommon for initialDownlinkBWP or BWP-UplinkCommon for initialUplinkBWP) is given by a higher layer.

The given field will be referred to as a frequency domain resource assignment field below. However, the name of the given field is not limited to this. Furthermore, the first aspect may be used alone, or may be combined with other aspects. Furthermore, control according to the first aspect may be performed not only by the user terminal (e.g., UE), but also by a radio base station (e.g., an eNB, a gNB: gNodeB or a TRP: Transmission Reception Point).

According to the first aspect, when the above information related to the initial BWP is given by the higher layer, the user terminal may determine the number of bits of the frequency domain resource assignment field in DCI based on a bandwidth given by specific information (e.g., locationAndBandwidth) in the above information related to the initial BWP.

On the other hand, when the above information related to the initial BWP is given by the higher layer, the user terminal may determine the number of bits of the frequency domain resource assignment field in the DCI based on the bandwidth given by an index (e.g., pdcch-ConfigSIB1) via a PBCH.

In this regard, the DCI including the frequency domain resource assignment field may be DCI (DL assignment) used for scheduling a PDSCH, or DCI (UL grant) used for scheduling a PUSCH.

<Control of the Number of Bits of Frequency Domain Resource Assignment Field in DL Assignment>

Figure 3:
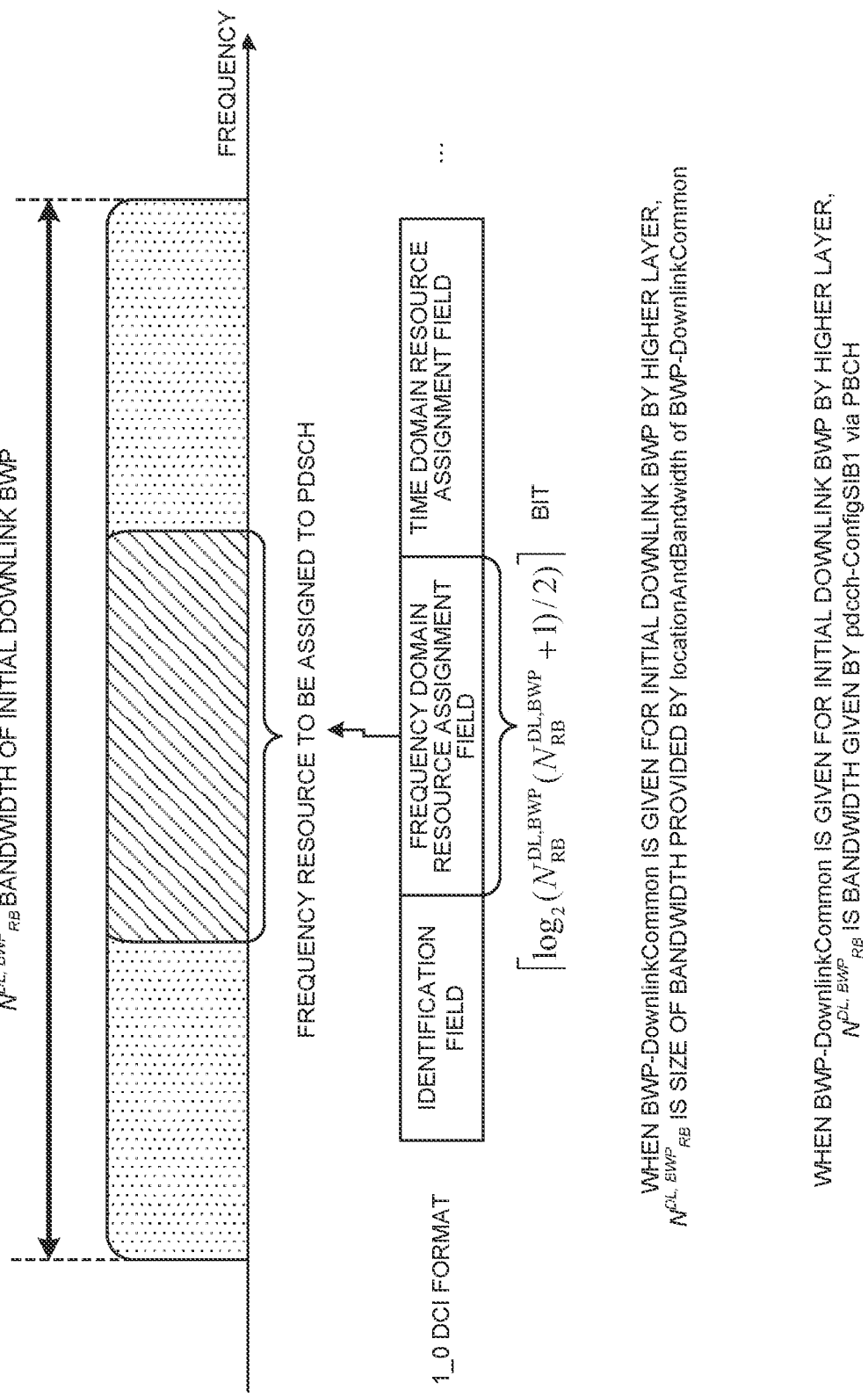
FIG. 3 is a diagram illustrating one example of determination of the number of bits of a frequency domain resource assignment field in a DL assignment according to a first aspect.

FIG. 3 is a diagram illustrating one example of determination of the number of bits of the frequency domain resource assignment field in the DL assignment according to the first aspect. The DL assignment may include at least one of a DCI format 1_0 and a DCI format 1_1. FIG. 3 illustrates the DCI format 1_0 as one example of the DL assignment. The DL assignment may be any DCI used for scheduling a PDSCH.

Furthermore, the DCI format 1_0 in FIG. 3 may be subjected to CRC scrambling by a given identifier. The given identifier may be at least one of, for example, a Cell-Radio Network Temporary Identifier (C-RNTI), a Paging-RNTI (P-RNTI), a System Information-RNTI (SI-RNTI), a Random Access-RNTI (RA-RNTI) and a Temporary Cell-RNTI (TC-RNTI).

As illustrated in FIG. 3, a frequency resource to be assigned to a PDSCH in a bandwidth $N^{DL,\ BWP}_{RB}$ of an initial downlink BWP is indicated by a frequency domain resource assignment field of the DCI format 1_0.

In this regard, the assignment of the frequency resource for the PDSCH in FIG. 3 is only exemplary. Non-contiguous frequency resources may be assigned to the PDSCH. Furthermore, an assignment unit of the frequency resources may be an RB, or may be a Resource Block Group (RBG) including one or more RBs.

As illustrated in FIG. 3, the number of bits of the frequency domain resource assignment field may be determined based on the bandwidth $N^{DL,\ BWP}_{RB}$ of the initial downlink BWP. For example, the number of bits is determined based on following equation (1) in FIG. 3.

[Mathematical 1]

$$\lceil \log_2(NR_{RB}^{DL,BWP}(N_{RB}^{DL,BWP}+1)/2) \rceil \qquad \text{Equation (1)}$$

In this regard, when BWP-DownlinkCommon for initialDownlinkBWP (the information related to the band for initial access) is given by a higher layer, $N^{DL,\ BWP}_{RB}$ in equation (1) may be a bandwidth given by locationAndBandwidth (specific information) of above BWP-DownlinkCommon. In addition, determination of the bandwidth based on at least one bit that composes locationAndBandwidth is as described above.

On the other hand, when BWP-DownlinkCommon for initialDownlinkBWP is not given by the higher layer, $N^{DL,\ BWP}_{RB}$ in equation (1) may be a bandwidth given by pdcch-ConfigSIB1 (index) in an MIB conveyed via a PBCH. In addition, determination of the bandwidth based on at least one bit that composes pdcch-ConfigSIB1 is as described above.

Thus, when BWP-DownlinkCommon for initialDownlinkBWP is given by the higher layer, the user terminal may determine the number of bits of the frequency domain resource assignment field in the DL assignment based on the bandwidth given by locationAndBandwidth of this BWP-DownlinkCommon.

Furthermore, when BWP-DownlinkCommon for initialDownlinkBWP is not given by the higher layer, the user terminal may determine the number of bits of the frequency domain resource assignment field in the DL assignment based on the bandwidth given by pdcch-ConfigSIB1 via the PBCH.

In addition, that "BWP-DownlinkCommon for initialDownlinkBWP is given by the higher layer" may be paraphrased as a case where at least one of an SIB 1 and an RRC message includes BWP-DownlinkCommon for initialDownlinkBWP. A hierarchical structure of BWP-DownlinkCommon in the SIB 1 is exemplified in, for example, FIG. 2, yet is not limited to this. Furthermore, the RRC message only needs to be an RRC message (e.g., an RRCReconfiguration message) to be transmitted by at least one of a handover procedure, a PSCell addition procedure and an SCell addition procedure.

Furthermore, above equation (1) is only exemplary. The number of bits of the frequency domain resource assignment field may be determined by using equations other than above equation (1). When, for example, the DCI format 1_0 subjected to CRC scrambling by a P-RNTI conveys a short message, the number of bits of the frequency domain resource assignment field may be determined based on following equation (2).

[Mathematical 2]

$$\lceil [\log_2(N_{RB}^{DL,BWP}(N_{RB}^{DL,BWP}+1)/2)]+19 \rceil \qquad \text{Equation (2)}$$

<Control of the Number of Bits of Frequency Domain Resource Assignment Field in UL Grant>

Figure 4:
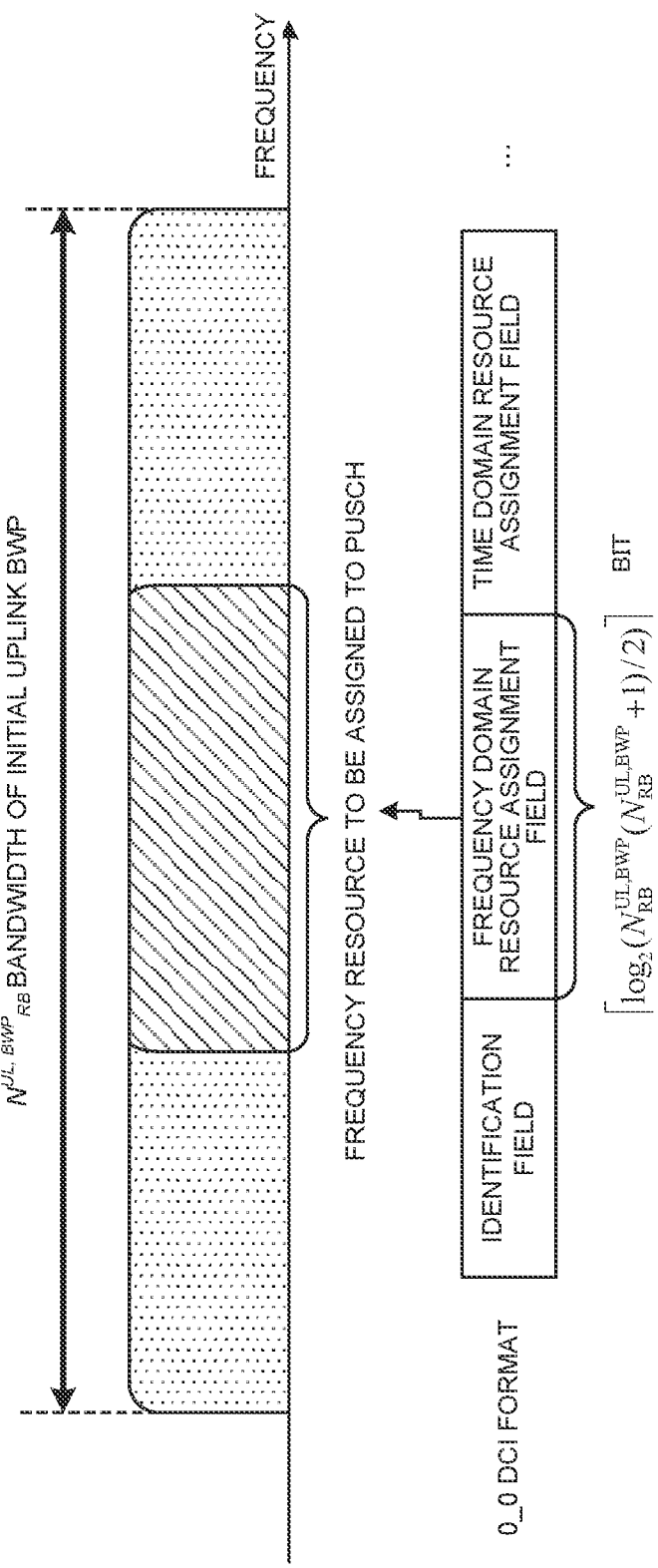
FIG. 4 is a diagram illustrating one example of determination of the number of bits of a frequency domain resource assignment field in a UL assignment according to the first aspect.

FIG. 4 is a diagram illustrating one example of determination of the number of bits of a frequency domain resource assignment field in a UL grant according to the first aspect. The UL grant may include at least one of the DCI format 0_0 and the DCI format 0_1. FIG. 4 illustrates the DCI format 0_0 as one example of the UL grant. However, the UL grant may be any DCI used for scheduling a PUSCH.

Furthermore, the DCI format 0_0 in FIG. 4 may be subjected to CRC scrambling by a given identifier. The given identifier may be at least one of, for example, a C-RNTI and a TC-RNTI.

As illustrated in FIG. 4, a frequency resource to be assigned to a PUSCH in a bandwidth $N^{UL,\ BWP}_{RB}$ of an initial uplink BWP is indicated by a frequency domain resource assignment field of the DCI format 0_0.

In this regard, the assignment of the frequency resource for the PDSCH in FIG. 4 is only exemplary. Non-contiguous frequency resources may be assigned to the PUSCH. Furthermore, an assignment unit of the frequency resources may be an RB, or may be a Resource Block Group (RBG) including one or more RBs.

As illustrated in FIG. 4, the number of bits of the frequency domain resource assignment field may be determined based on the bandwidth $N^{UL,\ BWP}_{RB}$ of the initial uplink BWP. For example, the number of bits is determined based on following equation (3) in FIG. 3.

[Mathematical 3]

$$\lceil \log_2(N_{RB}^{UL,BWP}(N_{RB}^{UL,BWP}+1)/2) \rceil \qquad \text{Equation (3)}$$

In this regard, when BWP-UplinkCommon for initialUplinkBWP (the information related to the band for initial access) is given by a higher layer, $N^{UL,\ BWP}_{RB}$ in equation (3) may be a bandwidth given by locationAndBandwidth (specific information) of above BWP-UplinkCommon. In addition, determination of the bandwidth based on at least one bit that composes locationAndBandwidth is as described above.

On the other hand, when BWP-UplinkCommon for initialUplinkBWP is not given by the higher layer, $N^{UL,\ BWP}_{RB}$ in equation (3) may be a bandwidth given by pdcch-ConfigSIB1 (index) in an MIB conveyed via a PBCH. In addition, determination of the bandwidth based on at least one bit that composes pdcch-ConfigSIB1 is as described above.

Thus, when BWP-UplinkCommon for initialUplinkBWP is given by the higher layer, the user terminal may determine the number of bits of the frequency domain resource assignment field in the UL grant based on the bandwidth given by locationAndBandwidth of BWP-UplinkCommon.

Furthermore, when BWP-UplinkCommon for initialUplinkBWP is not given by the higher layer, the user terminal may determine the number of bits of the frequency domain resource assignment field in the UL grant based on the bandwidth given by pdcch-ConfigSIB1 via the PBCH.

In addition, that "BWP-UplinkCommon for initialUplinkBWP is given by the higher layer" may be paraphrased as a case where at least one of an SIB 1 and an RRC message includes BWP-UplinkCommon for initialUplinkBWP. A hierarchical structure of BWP-UplinkCommon in the SIB 1 is exemplified in, for example, FIG. 2, yet is not limited to this. Furthermore, the RRC message only needs to be an RRC message (e.g., RRCReconfiguration message) to be transmitted by at least one of a handover procedure, a PSCell addition procedure and an SCell addition procedure.

Furthermore, above equation (3) is only exemplary. The number of bits of the frequency domain resource assignment field may be determined by using equations other than above equation (3).

As described above, according to the first aspect, the number of bits of the frequency domain resource assignment field in the DCI is determined based on whether or not information related to an initial BWP (e.g., BWP-DownlinkCommon for initialDownlinkBWP or BWP-UplinkCommon for initialUplinkBWP) is given by a higher layer, so that the user terminal can appropriately control reception of a PDSCH and transmission of a PUSCH to be assigned by the initial BWP based on the DCI.

(Second Aspect)

According to the second aspect, a user terminal may control bit selection during rate matching of a PDSCH or a PUSCH based on whether or not information related to an initial BWP (a band for initial access) (e.g., BWP-DownlinkCommon for initialDownlinkBWP or BWP-UplinkCommon for initialUplinkBWP) is given by a higher layer. Differences of the second aspect from those of the first aspect will be mainly described. Furthermore, the second aspect may be used alone, or may be combined with other aspects. Furthermore, control according to the second aspect may be performed by a radio base station.

According to the second aspect, when the above information related to the initial BWP is given by the higher layer, the user terminal may control bit selection during rate matching of a PDSCH or a PUSCH based on a bandwidth given by specific information (e.g., locationAndBandwidth) in the above information related to the initial BWP.

On the other hand, when the above information related to the initial BWP is given by the higher layer, the user terminal may control bit selection during rate matching of the PDSCH or the PUSCH based on the bandwidth given by an index (e.g., pdcch-ConfigSIB1) via a PBCH.

In this regard, bit selection during rate matching may mean selecting from a circular buffer of a given length in which encoded bit sequences are stored a given number of bits (e.g., contiguous bits) matching resources (e.g., the number of Resource Elements (REs) that are available among one or more RBs to be assigned to the PDSCH or the PUSCH) assigned for transmission.

In addition, above rate matching is, for example, rate matching for an LDPC.

Figure 5:
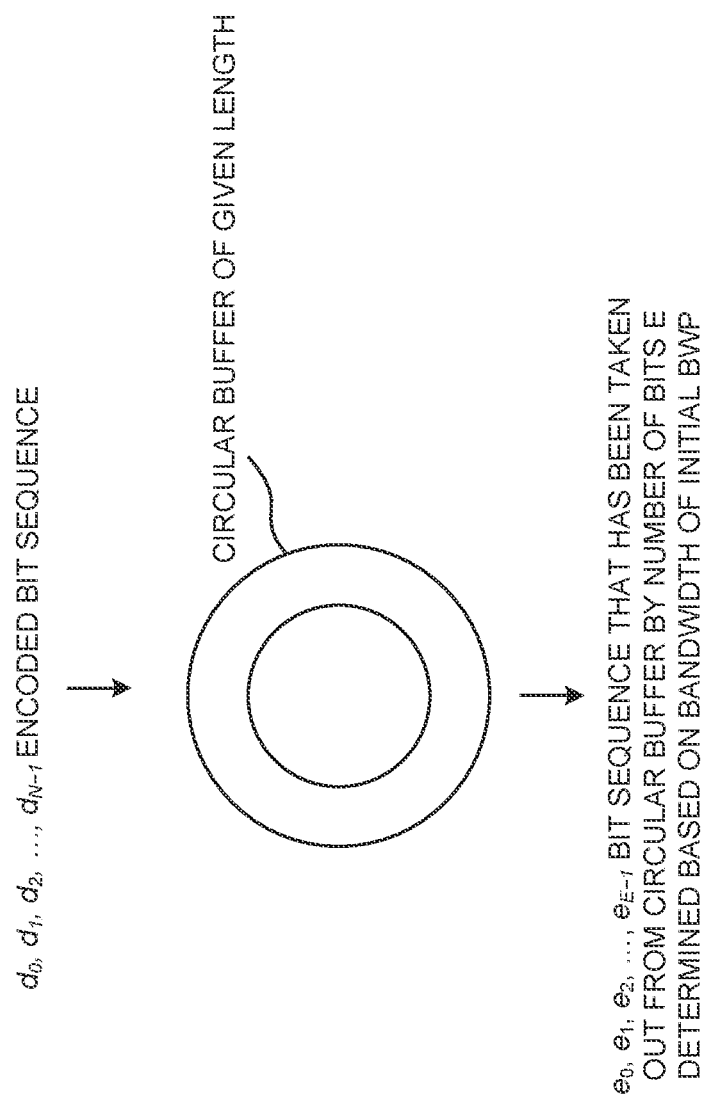
FIG. 5 is a diagram illustrating one example of control of bit selection during rate matching according to a second aspect.

FIG. 5 is a diagram illustrating one example of control of bit selection during rate matching according to the second aspect. In addition, the bit selection during the rate matching exemplified in FIG. 5 may be applied to rate matching of data (also referred to as, for example, a transport block or a code block), too, to be transmitted on one of a PDSCH and a PUSCH to be assigned to an initial BWP.

As illustrated in FIG. 5, bit sequences (e.g., output bits from an LDPC encoder) $d_0, d_1, \ldots, d_{N-1}$ including the number of encoded bits N are written in the circular buffer of the given length. The number of bits E taken out from the circular buffer may be determined based on the bandwidth of the initial BWP.

<Bit Selection During Rate Matching of DL-SCH>

Bit selection during rate matching of a Downlink Shared Channel (DL-SCH) that is a transport channel to be mapped on a PDSCH will be described in detail.

According to bit selection during rate matching of the DL-SCH, when BWP-DownlinkCommon for initialDownlinkBWP (information related to a band for initial access) is given by a higher layer, the number of bits E taken out from the circular buffer in FIG. 5 may be determined based on a bandwidth given by locationAndBandwidth (specific information) of above BWP-DownlinkCommon.

On the other hand, when BWP-DownlinkCommon for initialDownlinkBWP is not given by the higher layer, the number of bits E taken out from the circular buffer in FIG. 5 may be determined based on a bandwidth given by pdcch-ConfigSIB1 (index) in an MIB conveyed via a PBCH.

<Bit Selection During Rate Matching of UL-SCH>

Bit selection during rate matching of an Uplink Shared Channel (UL-SCH) that is a transport channel to be mapped on a PUSCH will be described in detail.

According to bit selection during rate matching of the UL-SCH, when BWP-UplinkCommon for initialUplinkBWP (information related to a band for initial access) is given by a higher layer, the number of bits E taken out from the circular buffer in FIG. 5 may be determined based on a bandwidth given by locationAndBandwidth (specific information) of above BWP-UplinkCommon.

On the other hand, when BWP-UplinkCommon for initialUplinkBWP is not given by the higher layer, the number of bits E taken out from the circular buffer in FIG. 5 may be determined based on a bandwidth given by pdcch-ConfigSIB1 (index) in an MIB conveyed via a PBCH.

As described above, according to the second aspect, the number of bits E taken out from the circular buffer during rate matching of a PDSCH or a PUSCH is determined based on whether or not the information related to the initial BWP (e.g., BWP-DownlinkCommon for initialDownlinkBWP or BWP-UplinkCommon for initialUplinkBWP) is given by the higher layer, so that the user terminal can appropriately control rate matching of the PDSCH or the PUSCH to be assigned to the initial BWP.

(Other Aspect)

An example where the above number of bits of a frequency domain resource assignment field in DCI (first aspect) and bit selection during rate matching (second aspect) are controlled based on whether or not information related to an initial BWP (e.g., BWP-DownlinkCommon for initialDownlinkBWP or BWP-UplinkCommon for initialUplinkBWP) is given by a higher layer has been described above.

However, "control of reception of a PDSCH or transmission of a PUSCH" based on whether or not the information related to the initial BWP is given by the higher layer is not limited to control described in the above first and second aspects, and may be any control related to transmission/reception of the PDSCH or the PUSCH.

In a case where a bandwidth ($N^{size}_{BWP}$) of the initial BWP is taken into account when a frequency resource is determined based on the frequency domain resource assignment field in the DCI, the bandwidth may be determined under the same conditions as those of the first aspect and the second aspect.

(Radio Communication System)

The configuration of the radio communication system according to the present embodiment will be described below. This radio communication system uses one or a combination of the radio communication method according to each of the above embodiment of the present disclosure to perform communication.

Figure 6:
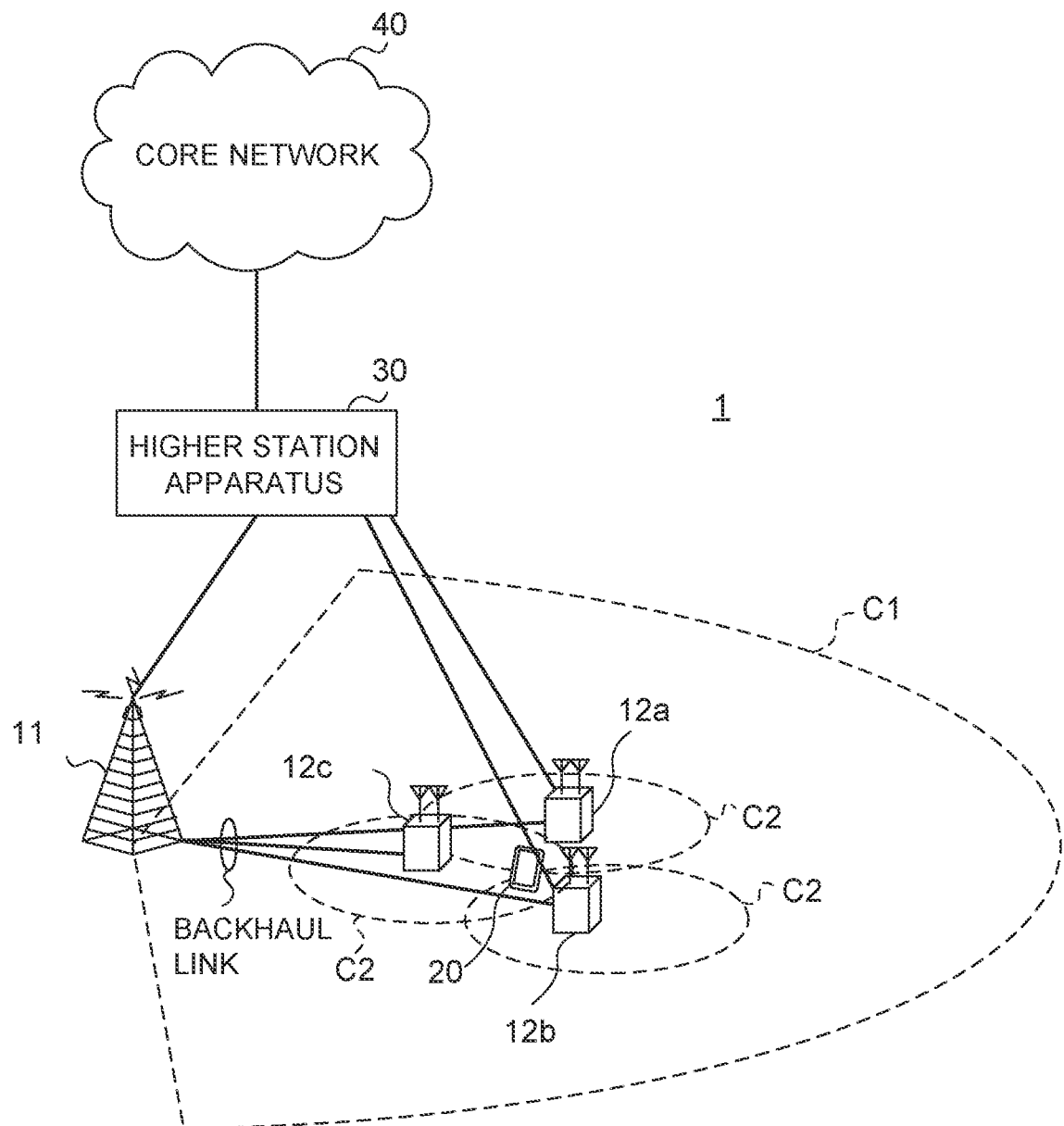
FIG. 6 is a diagram illustrating one example of a schematic configuration of a radio communication system according to the present embodiment.

FIG. 6 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 6.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain. For example, a case where subcarrier spacings of constituent OFDM symbols are different and/or a case where the numbers of OFDM symbols are different on a certain physical channel may be read as that numerologies are different.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

<Radio Base Station>

Figure 7:
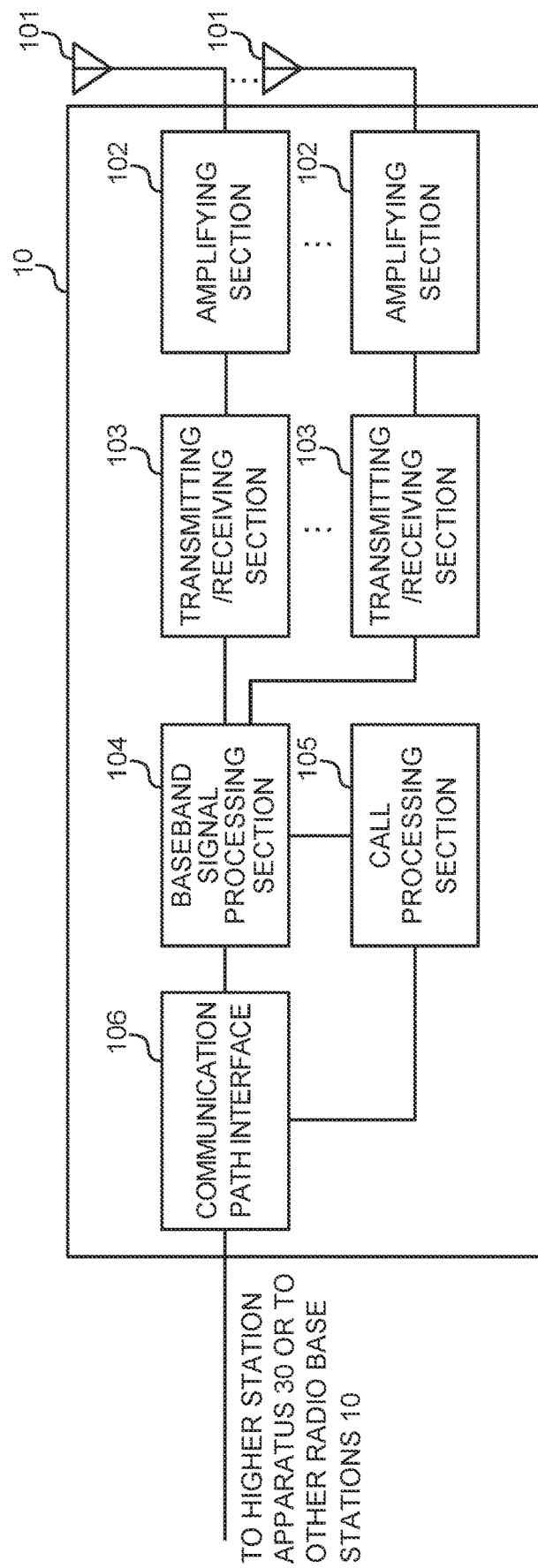
FIG. 7 is a diagram illustrating one example of an overall configuration of a radio base station according to the present embodiment.

FIG. 7 is a diagram illustrating one example of an overall configuration of the radio base station according to the present embodiment. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 transmits a DL signal (e.g., at least one of a PDCCH (DCI), a PDSCH (DL data or higher layer control information) and a DL reference signal). Furthermore, each transmitting/receiving section 103 receives a UL signal (e.g., at least one of a PUCCH (UCI), a PUSCH (UL data, higher layer control information or UCI) and a UL reference signal).

Each transmitting/receiving section 103 transmits downlink control information including a given field indicating a frequency domain resource to be assigned to the PDSCH or the PUSCH. Furthermore, each transmitting/receiving section 103 may transmit an MIB via a PBCH. Furthermore, each transmitting/receiving section 103 may transmit at least one of an SIB 1 and an RRC message.

Figure 8:
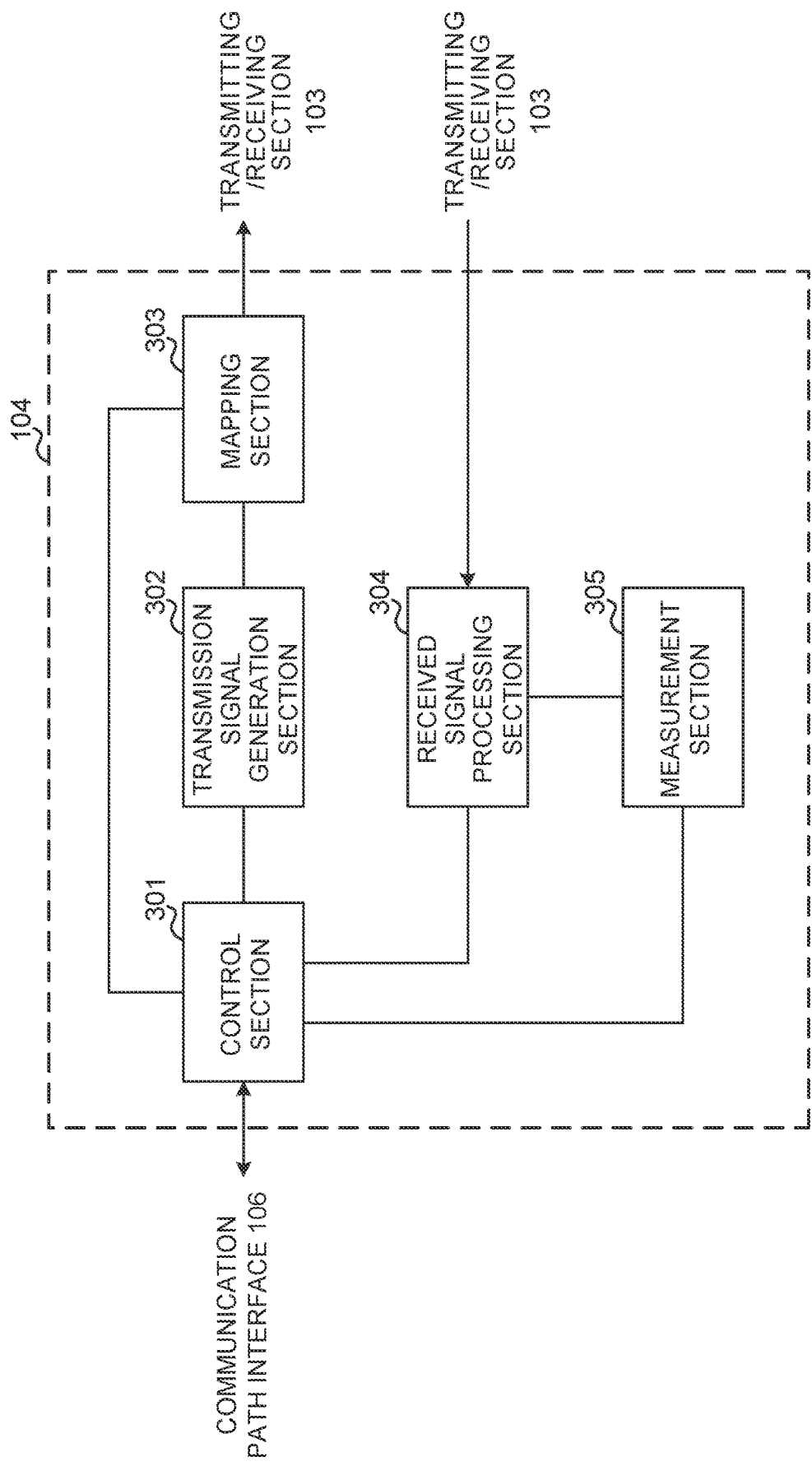
FIG. 8 is a diagram illustrating one example of a function configuration of the radio base station according to the present embodiment.

FIG. 8 is a diagram illustrating one example of a function configuration of the radio base station according to the present embodiment. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal assignment of the mapping section 303. Furthermore, the control section 301 controls signal reception processing of the received signal processing section 304 and signal measurement of the measurement section 305.

The control section 301 controls scheduling (e.g., resource assignment) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may control at least one of generation and transmission of downlink control information including a given field (e.g., frequency domain assignment field) indicating a frequency domain resource to be assigned to the PDSCH or the PUSCH.

The control section 301 may control transmission of the PDSCH or reception of the PUSCH. More specifically, the control section 301 may control transmission of the PDSCH or reception of the PUSCH based on whether or not information related to an initial BWP (a band for initial access) in a carrier is given by a higher layer.

For example, when the information related to the initial BWP is given by the higher layer, the control section 301 may determine the number of bits of the given field based on a bandwidth given by specific information in the information related to the initial BWP (first aspect).

On the other hand, when the information related to the initial BWP is not given by the higher layer, the control section 301 may determine the number of bits of the given field based on a bandwidth given by an index (an index in the MIB) conveyed via the PBCH (first aspect).

Furthermore, when the information related to the initial BWP is given by the higher layer, the control section 301 may control bit selection during rate matching of the PDSCH or the PUSCH based on the bandwidth given by the specific information in the information related to the initial BWP (second aspect).

Furthermore, when the information related to the initial BWP is not given by the higher layer, the control section 301 may control bit selection during rate matching of the PDSCH or the PUSCH based on the bandwidth given by the index (the index in the MIB) conveyed via the PBCH.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data assignment information, and/or a UL grant for giving notification of uplink data assignment information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

<User Terminal>

Figure 9:
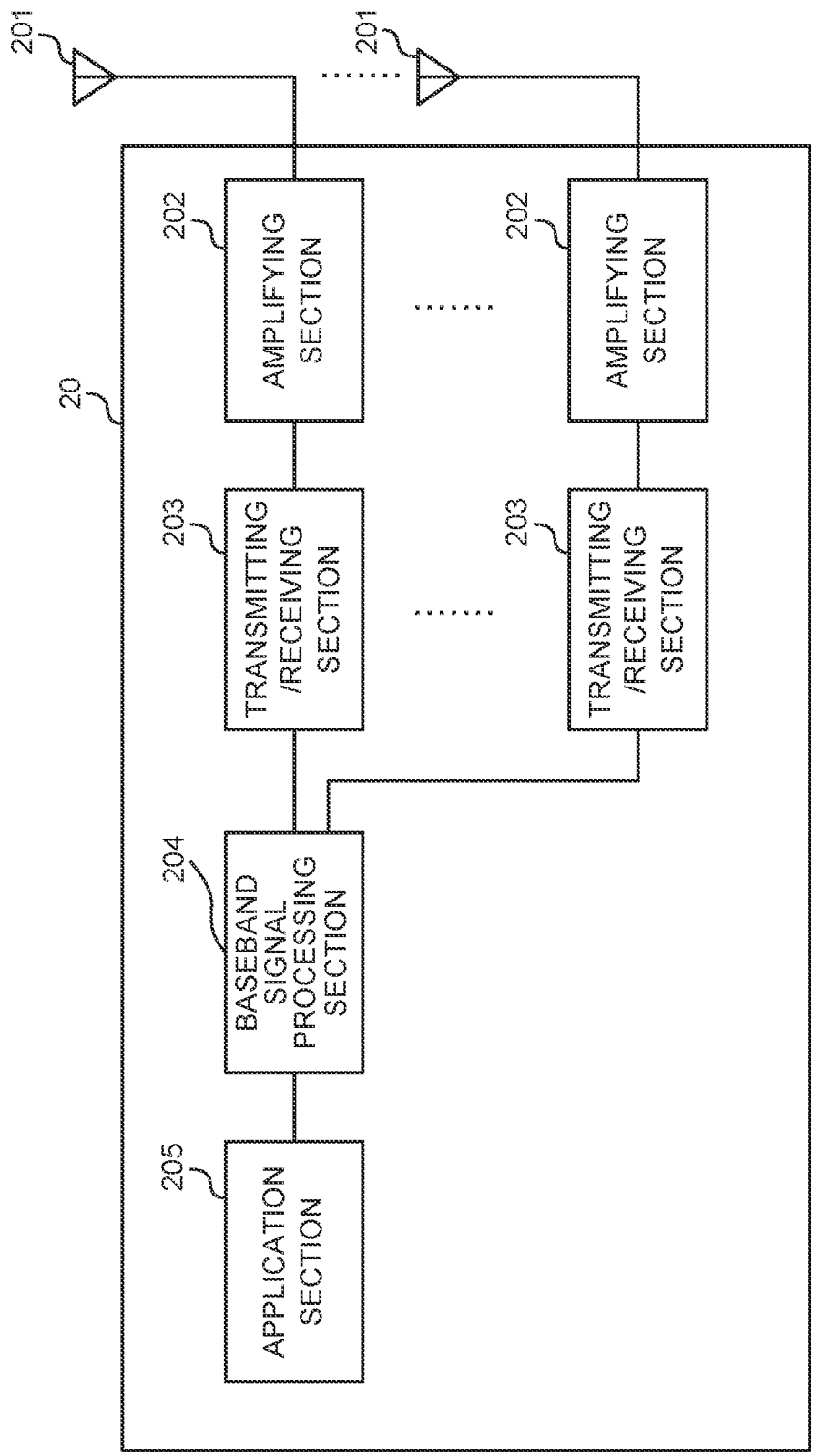
FIG. 9 is a diagram illustrating one example of an overall configuration of a user terminal according to the present embodiment.

FIG. 9 is a diagram illustrating one example of an overall configuration of the user terminal according to the present embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives the DL signal (e.g., at least one of the PDCCH (DCI), the PDSCH (the DL data or the higher layer control information) and the DL reference signal). Furthermore, each transmitting/receiving section 203 transmits the UL signal (e.g., at least one of the PUCCH (UCI), the PUSCH (the UL data, the higher layer control information or the UCI) and the UL reference signal).

Each transmitting/receiving section 203 receives the downlink control information including the given field indicating the frequency domain resource to be assigned to the PDSCH or the PUSCH. Furthermore, each transmitting/receiving section 203 may receive the MIB via the PBCH. Furthermore, each transmitting/receiving section 203 may transmit at least one of the SIB 1 and the RRC message.

Figure 10:
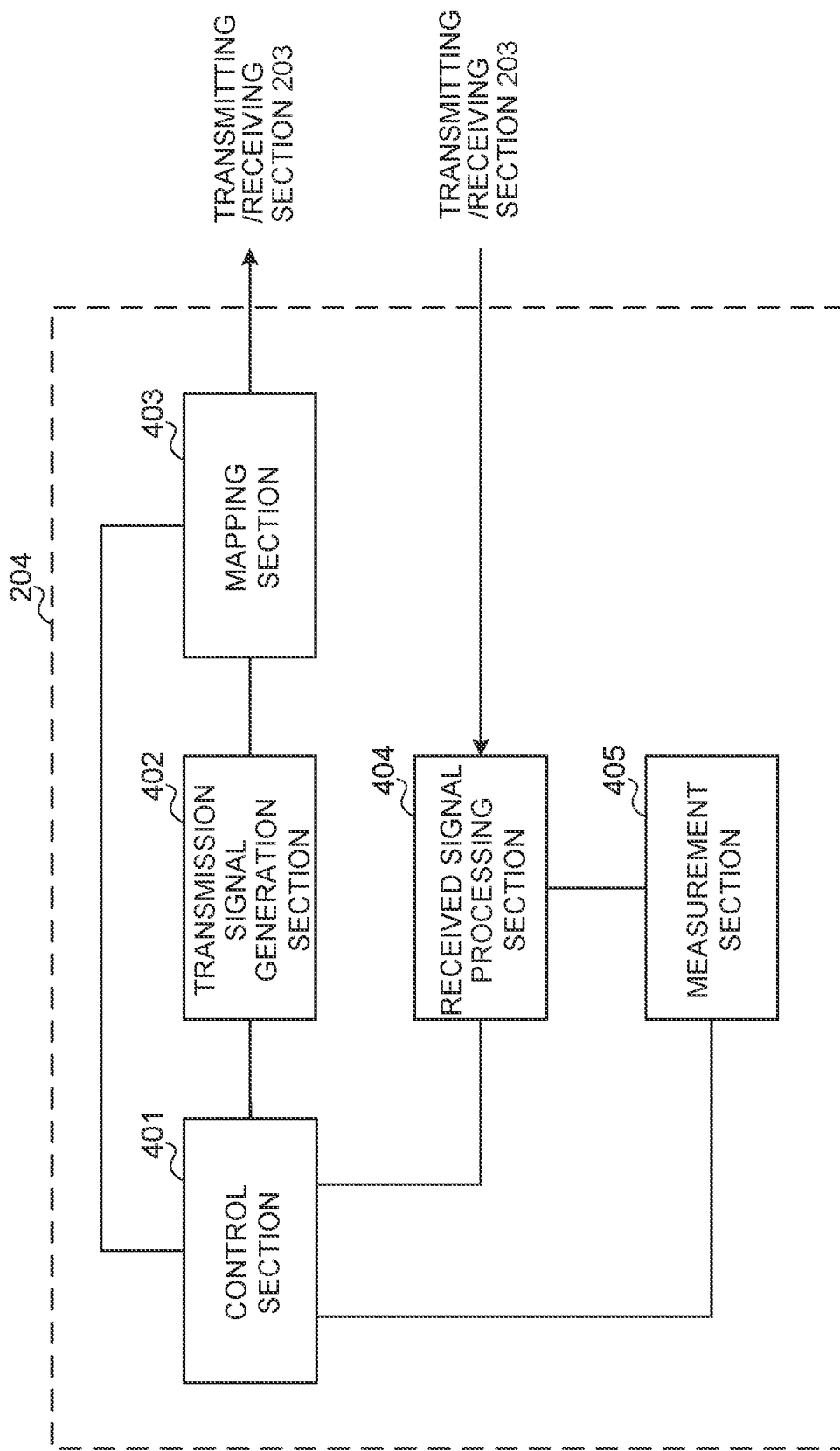
FIG. 10 is a diagram illustrating one example of a function configuration of the user terminal according to the present embodiment.

FIG. 10 is a diagram illustrating one example of a function configuration of the user terminal according to the present embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal assignment of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 monitors (blind-decodes) a CORESET (or a search space in the CORESET), and detects DCI. More specifically, the control section 401 may control detection of the DCI including the given field (e.g., frequency domain assignment field) indicating the frequency domain resource to be assigned to the PDSCH or the PUSCH.

The control section 401 may control reception of the PDSCH or transmission of the PUSCH. More specifically, the control section 301 may control reception of the PDSCH or transmission of the PUSCH based on whether or not the information related to the initial BWP (the band for initial access) in the carrier is given by the higher layer. Furthermore, the control section 301 may control reception of the PDSCH or transmission of the PUSCH based on the DCI including the above given field.

For example, when the information related to the initial BWP is given by the higher layer, the control section 401 may determine the number of bits of the given field based on the bandwidth given by the specific information in the information related to the initial BWP (first aspect).

On the other hand, when the information related to the initial BWP is not given by the higher layer, the control section 401 may determine the number of bits of the given field based on the bandwidth given by the index (the index in the MIB) conveyed via the PBCH (first aspect).

Furthermore, when the information related to the initial BWP is given by the higher layer, the control section 401 may control bit selection during rate matching of the PDSCH or the PUSCH based on the bandwidth given by the specific information in the information related to the initial BWP (second aspect).

Furthermore, when the information related to the initial BWP is not given by the higher layer, the control section 401 may control bit selection during rate matching of the PDSCH or the PUSCH based on the bandwidth given by the index (the index in the MIB) conveyed via a broadcast channel (second aspect).

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 11:
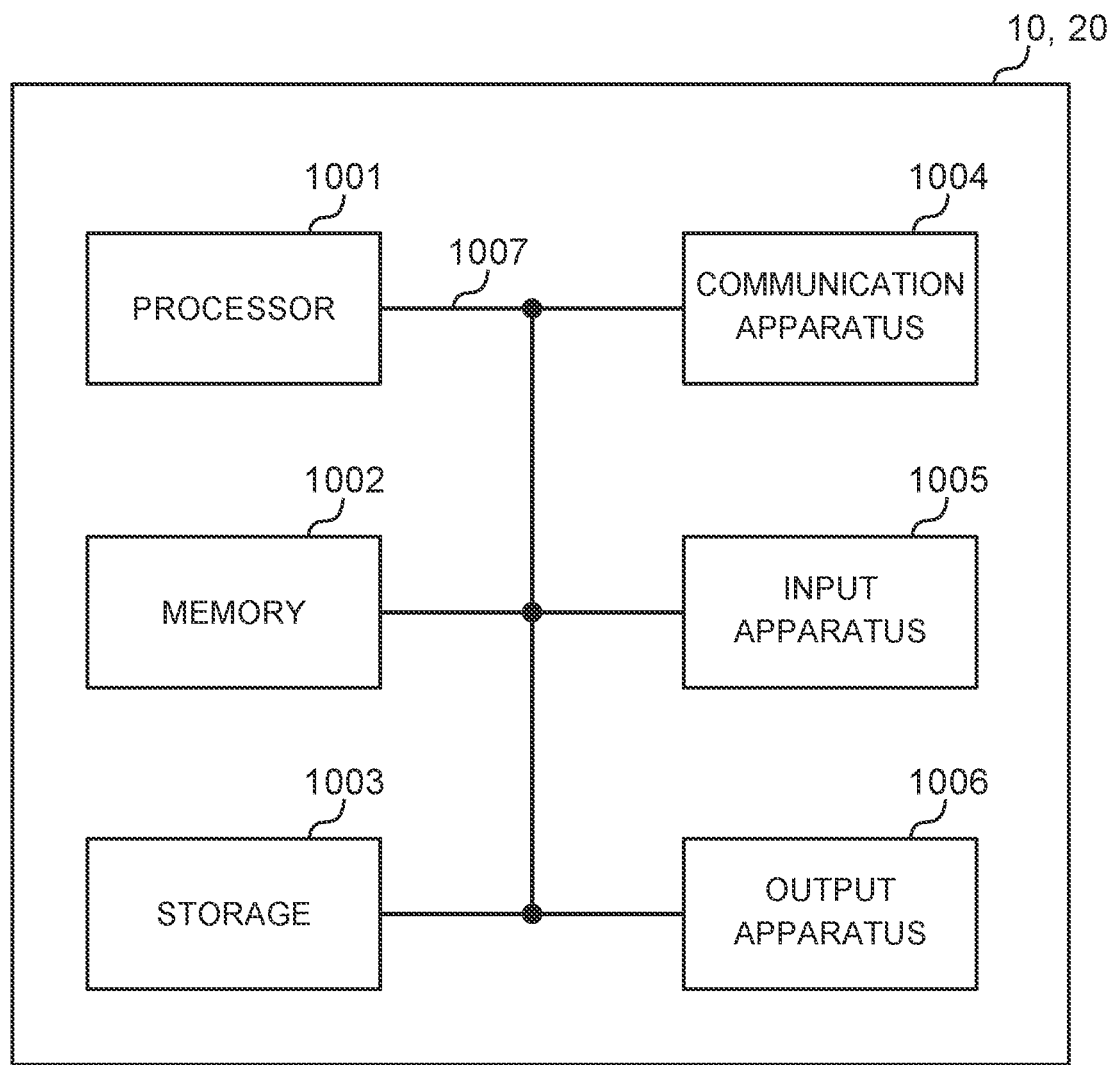
FIG. 11 is a diagram illustrating one example of hardware configurations of the radio base station and the user terminal according to the present embodiment.

For example, the radio base station and the user terminal according to the present embodiment of the present disclosure may function as computers that perform processing of the radio communication method according to the present disclosure. FIG. 11 is a diagram illustrating one example of the hardware configurations of the radio base station and the user terminal according to the present embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the present embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for assigning radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource assignment unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of the base station and/or the base station subsystem that provide a communication service in this coverage.

In this description, the terms "Mobile Station (MS)", "user terminal", "user apparatus (UE: User Equipment)" and "terminal" can be interchangeably used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
a receiver that receives a downlink control information including a field that indicates a frequency domain resource, assigned to a downlink shared channel; and
a processor that determines an initial downlink bandwidth part (BWP) based on whether information regarding the initial downlink BWP, within a cell, is provided via a higher layer, the determined initial downlink BWP being used for determining a number of bits of the field.

2. The terminal according to claim 1, wherein, if the information regarding the initial downlink BWP is provided, the processor determines the initial downlink BWP based on the information regarding the initial downlink BWP.

3. The terminal according to claim 1, wherein if the information regarding the initial downlink BWP is not provided, the processor determines the initial downlink BWP as a bandwidth provided by an index of a master information block (MIB).

4. The terminal according to claim 2, wherein if the information regarding the initial downlink BWP is not provided, the processor determines the initial downlink BWP as a bandwidth provided by an index of a master information block (MIB).

5. The terminal according to claim 1, wherein bit selection during rate matching of the downlink shared channel is controlled based on the initial downlink BWP.

6. The terminal according to claim 2, wherein bit selection during rate matching of the downlink shared channel is controlled based on the initial downlink BWP.

7. The terminal according to claim 3, wherein bit selection during rate matching of the downlink shared channel is controlled based on the initial downlink BWP.

8. The terminal according to claim 1, wherein the information regarding the initial downlink BWP is contained in a system information block (SIB1) or a radio resource control (RRC) message.

9. The terminal according to claim 2, wherein the information regarding the initial downlink BWP is contained in a system information block (SIB1) or a radio resource control (RRC) message.

10. The terminal according to claim 3, wherein the information regarding the initial downlink BWP is contained in a system information block (SIB1) or a radio resource control (RRC) message.

11. The terminal according to claim 5, wherein the information regarding the initial downlink BWP is contained in a system information block (SIB1) or a radio resource control (RRC) message.

12. A radio communication method for a terminal comprising:
receiving a downlink control information including a field that indicates a frequency domain resource, assigned to a downlink shared channel; and
determining an initial downlink bandwidth part (BWP) based on whether information regarding the initial downlink BWP, within a cell, is provided via a higher layer, the determined initial downlink BWP being used for determining a number of bits of the field.

13. A system comprising a base station and a terminal, wherein:
the base station comprises:
a transmitter that transmits a downlink control information including a field that indicates a frequency domain resource, assigned to a downlink shared channel, and
the terminal comprises:
a receiver that receives the downlink control information; and
a processor that determines an initial downlink bandwidth part (BWP) based on whether information regarding the initial downlink BWP, within a cell, is provided via a higher layer, the determined initial downlink BWP being used for determining a number of bits of the field.

* * * * *